(12) United States Patent
Tanabe et al.

(10) Patent No.: US 9,118,053 B2
(45) Date of Patent: Aug. 25, 2015

(54) FUEL CELL SYSTEM AND METHOD FOR PERFORMING MAINTENANCE ON FUEL CELL SYSTEM

(75) Inventors: Naohisa Tanabe, Kyoto (JP); Akinori Yukimasa, Osaka (JP)

(73) Assignee: Panasonic Intellectual Property Management Co., Ltd. (JP)

( * ) Notice: Subject to any disclaimer, the term of this patent is extended or adjusted under 35 U.S.C. 154(b) by 480 days.

(21) Appl. No.: 13/144,842

(22) PCT Filed: Dec. 2, 2010

(86) PCT No.: PCT/JP2010/007022
§ 371 (c)(1),
(2), (4) Date: Jul. 15, 2011

(87) PCT Pub. No.: WO2011/067930
PCT Pub. Date: Jun. 9, 2011

(65) Prior Publication Data
US 2011/0274995 A1 Nov. 10, 2011

(30) Foreign Application Priority Data
Dec. 3, 2009 (JP) .................................. 2009-275132

(51) Int. Cl.
*H01M 8/06* (2006.01)
*C01B 3/38* (2006.01)
(Continued)

(52) U.S. Cl.
CPC ............... *H01M 8/0625* (2013.01); *C01B 3/38* (2013.01); *C01B 3/48* (2013.01); *H01M 8/0618* (2013.01);
(Continued)

(58) Field of Classification Search
CPC ....... H01M 8/04; H01M 8/00; H01M 8/0625; H01M 8/0618; H01M 8/04022; C01B 2203/0233; C01B 2203/0283; C01B 2203/066; C01B 3/48; C01B 3/38; Y02E 60/50; Y10T 29/49815
USPC .......................... 429/400, 423; 422/198, 211
See application file for complete search history.

(56) References Cited

U.S. PATENT DOCUMENTS

2003/0223926 A1* 12/2003 Edlund et al. ................. 422/198
2005/0048348 A1* 3/2005 Bazzarella ...................... 429/34
2006/0191200 A1* 8/2006 Maenishi et al. ............ 48/127.9

FOREIGN PATENT DOCUMENTS

JP H06-203859 * 7/1994 .............. H01M 8/04
JP 11-185789 A 7/1999
(Continued)

OTHER PUBLICATIONS
Aono et al JP 3102267B2 partial Oral Translation—USPTO Feb. 20, 2015.*
(Continued)

*Primary Examiner* — Patrick Ryan
*Assistant Examiner* — Aaron Greso
(74) *Attorney, Agent, or Firm* — Brinks Gilson & Lione

(57) ABSTRACT

A fuel cell system according to the present invention comprises a hydrogen generator including a burner which is detachably accommodated in the hydrogen generator in a manner to allow the burner to be detached from and attached to the hydrogen generator through the top of the hydrogen generator, a stack configured to generate power by causing hydrogen generated by the hydrogen generator and an oxidizing gas to react with each other, and a main body package which includes at least a top plate and within which the hydrogen generator and the stack are disposed. Detachable piping, which is detachably configured, is provided above the hydrogen generator. Space that is formed above the burner when the detachable piping is removed from the main body package has a size larger than or equal to the size of the burner.

4 Claims, 6 Drawing Sheets

(51) Int. Cl.
*C01B 3/48* (2006.01)
*H01B 3/38* (2006.01)
*H01B 3/48* (2006.01)
*H01M 8/04* (2006.01)

(52) U.S. Cl.
CPC . *C01B 2203/0233* (2013.01); *C01B 2203/0283* (2013.01); *C01B 2203/066* (2013.01); *H01M 8/04022* (2013.01); *H01M 8/04223* (2013.01); *Y02E 60/50* (2013.01); *Y10T 29/49815* (2015.01)

(56) References Cited

FOREIGN PATENT DOCUMENTS

| | | | | |
|---|---|---|---|---|
| JP | 2000-247136 A | 9/2000 | | |
| JP | 3102267 | * 10/2000 | ............. | H01M 8/04 |
| JP | 2001-050172 A | 2/2001 | | |
| JP | 2002-175820 A | 6/2002 | | |
| JP | 2003-214712 A | 7/2003 | | |
| JP | 2003-229148 A | 8/2003 | | |
| JP | 2004-144413 A | 5/2004 | | |
| JP | 2005-251493 A | 9/2005 | | |
| JP | 2006-234268 A | 9/2006 | | |
| JP | 2007-031185 | 2/2007 | | |
| JP | 2008-027855 A | 2/2008 | | |
| JP | 2008-108449 A | 5/2008 | | |
| JP | 2008-192435 A | 8/2008 | | |
| JP | 2008-218360 | * 9/2008 | ............. | H01M 8/04 |
| JP | 2008-262849 A | 10/2008 | | |
| JP | 2009-087619 A | 4/2009 | | |
| JP | 2009-129621 A | 6/2009 | | |
| JP | 2009-266638 A | 11/2009 | | |
| WO | WO 2009/037845 A1 | 3/2009 | | |

OTHER PUBLICATIONS

International Search Report for International Application No. PCT/JP2010/007022, dated Mar. 1, 2011, 2 pages.
Supplementary European Search Report in corresponding European Application No. 10834383.1, dated Apr. 10, 2012, 6 pages.

* cited by examiner

FUEL CELL SYSTEM AND METHOD FOR PERFORMING MAINTENANCE ON FUEL CELL SYSTEM

This application is a 371 application of PCT/JP2010/007022 having an international filing date of Dec. 2, 2010, which claims priority to JP2009-275132 filed Dec. 3, 2009, the entire contents of which are incorporated herein by reference.

TECHNICAL FIELD

The present invention relates to a fuel cell system configured to generate power by causing hydrogen and oxygen to react with each other, and to a method for performing maintenance on the fuel cell system.

BACKGROUND ART

Conventional fuel cell systems include: a reformer configured to generate hydrogen gas (fuel gas) from a natural gas or the like; a fuel cell configured to generate power through an electrochemical reaction between the hydrogen gas and oxygen (air) acting as an oxidant (hereinafter, the fuel cell may be referred to as a stack, as necessary); a power conversion circuit configured to convert electrical energy generated by the stack into a voltage/frequency for commercial use (hereinafter, the power conversion circuit may be referred to as an inverter, as necessary); a ventilator configured to ventilate a package; and auxiliary devices (accessories) for allowing the stack and the reformer to operate smoothly. These devices are disposed within the package (see Patent Literature 1, for example).

FIG. 6 is a schematic diagram showing a schematic configuration of a fuel cell apparatus disclosed in Patent Literature 1.

As shown in FIG. 6, the fuel cell apparatus disclosed in Patent Literature 1 includes: a package 101; a fuel reforming device 102; a fuel cell 103; an electric control device 104 including an inverter; accessories 105; and a ventilation fan 106 serving as a ventilator for introducing external air into the package 101.

Within the package 101, the accessories 105 are disposed at the lowermost position. The fuel reforming device 102 and the electric control device 104 are arranged side by side above the accessories 105. The fuel cell 103 is disposed above the electric control device 104. The ventilation fan 106 is disposed, above the fuel reforming device 102, at a side face of the package 101.

The fuel reforming device 102 includes: a reformer configured to generate a hydrogen gas from a reforming reaction between water (steam) and a raw material gas such as a natural gas; and a burner for heating the reformer. The burner is a component which requires maintenance. Therefore, the burner is configured such that the burner is detachable from the reformer. Generally speaking, the burner has a length that is similar to the overall length of the reformer so that the burner can heat a wide area within the reformer, and the burner is detachably configured so that the burner can be inserted into or removed from the fuel reforming device 102 through the top of the reformer.

There is a very strong demand particularly for household fuel cell systems to be compact in size so that they can be installed in various houses having a wide variety of structures. Therefore, in general, in fuel cell systems, space between the components is reduced as much as possible, and thereby the fuel cell systems are configured to be compact in size.

PTL 1: Japanese Laid-Open Patent Application Publication No. 2003-229148

SUMMARY OF INVENTION

Technical Problem

However, in the case of the fuel cell apparatus configured in the conventional manner as disclosed in Patent Literature 1, at the time of removing the burner from the reformer for the purpose of performing maintenance on the burner, there is not sufficient space above the reformer for allowing the burner to be removed from the reformer. Therefore, it is necessary to first remove the reformer from the package 101 and then perform replacement of the burner. Thus, there is a problem of poor maintainability.

Assume a case, for example, where the top face of the package 101, which top face is positioned above the reformer, is configured as a detachable top plate. In this case, at the time of removing the burner from the reformer, removing the top plate renders the burner ready to be removed from the reformer without having to remove the reformer from the package 101.

However, even in this case, it is still necessary to remove the top plate from the package 101. This may cause water, such as rain water, to enter the package 101 from above during the maintenance. Thus, there is still a problem of poor maintainability.

The present invention has been made to solve the above conventional problems. An object of the present invention is to provide a fuel cell system and a method for performing maintenance on the fuel cell system, which realize improved maintainability of a burner of a hydrogen generator.

Solution to Problem

In order to solve the above conventional problems, a fuel cell system according to the present invention includes: a hydrogen generator including a burner which is detachably accommodated in the hydrogen generator in a manner to allow the burner to be detached from and attached to the hydrogen generator through the top of the hydrogen generator; a stack configured to generate power by causing hydrogen generated by the hydrogen generator and an oxidizing gas to react with each other; and a main body package which includes at least a top plate and within which the hydrogen generator and the stack are disposed. Detachable piping, which is detachably configured, is provided above the hydrogen generator. Space that is formed above the burner when the detachable piping is removed from the main body package has a size larger than or equal to the size of the burner.

Accordingly, by merely removing the detachable piping at the time of performing maintenance, space having a size larger than or equal to the size of the burner can be obtained above the hydrogen generator. This allows the burner to be readily attached to or detached from the hydrogen generator. Moreover, the burner can be attached to or detached from the hydrogen generator, that is, attached to or detached from the main body package, without having to remove the entire hydrogen generator from the main body package. This improves the maintainability.

In the fuel cell system according to the present invention, an auxiliary device may be provided above the detachable piping, and the auxiliary device may be provided such that the position of the auxiliary device is above the height of the burner from the hydrogen generator.

In the fuel cell system according to the present invention, the detachable piping may be piping through which a gas flows.

This makes it possible to prevent a situation, for example, where water leaks from piping at the time of removing the piping and the leakage water enters the main body package, causing a negative impact such as short-circuiting in electrical wiring provided within the main body package.

In the fuel cell system according to the present invention, the main body package may include at least one detachable side face plate, and the burner may be configured such that in a case where the detachable side face plate is removed and the detachable piping is removed, the burner is removed from the hydrogen generator through a side face of the main body package, from which side face the side face plate has been removed.

This allows the maintenance on the fuel cell system to be performed in a further simplified manner.

The fuel cell system according to the present invention may further include: an air inlet formed at a first side face plate of the main body package and configured to introduce air into the main body package; and an air outlet formed at a second side face plate of the main body package and configured to discharge air to the outside of the main body package. The air inlet may be provided at a position below the stack, and the air outlet may be provided at a position above the hydrogen generator such that the air outlet is opposed to the air inlet.

Accordingly, air for ventilation, which is to flow within the main body package, is sucked through the air inlet, which is positioned laterally with respect to the hydrogen generator, and is discharged from the air outlet, which is provided above the auxiliary device and which is positioned laterally with respect to the stack. This allows the stack and the hydrogen generator to be arranged at respective positions outside a passage through which the air for ventilation flows. This makes the temperatures of the stack and the hydrogen generator less likely to be affected by the ventilation. Therefore, the following situation can be prevented: a change occurs to the temperatures of the hydrogen generator and the stack, and accordingly, additional power or gas is required for temperature control, resulting in a decrease in the overall power generation efficiency of the fuel cell system. Moreover, according to the above configuration, the air for ventilation can be actively applied to the auxiliary device. In this manner, an increase in the temperature of the auxiliary device can be prevented.

A fuel cell system maintenance method according to the present invention is a method for performing maintenance on a fuel cell system which includes: a hydrogen generator including a burner which is detachably accommodated in the hydrogen generator in a manner to allow the burner to be detached from and attached to the hydrogen generator through the top of the hydrogen generator; a stack configured to generate power by causing hydrogen generated by the hydrogen generator and an oxidizing gas to react with each other; and a main body package which includes at least a top plate and within which the hydrogen generator and the stack are disposed. Detachable piping, which is detachably configured, is provided above the hydrogen generator. Space that is formed above the burner when the detachable piping is removed from the main body package has a size larger than or equal to the size of the burner. The method includes removing the detachable piping from the main body package and removing the burner from the hydrogen generator.

Accordingly, by merely removing the detachable piping at the time of performing maintenance, space having a size larger than or equal to the size of the burner can be obtained above the hydrogen generator. This allows the burner to be readily attached to or detached from the hydrogen generator. Moreover, the burner can be attached to or detached from the hydrogen generator, that is, attached to or detached from the main body package, without having to remove the entire hydrogen generator from the main body package. This improves the maintainability.

In the method for performing maintenance on the fuel cell system, according to the present invention, an auxiliary device may be provided above the detachable piping, and the auxiliary device may be provided such that the position of the auxiliary device is above the height of the burner from the hydrogen generator.

In the method for performing maintenance on the fuel cell system, according to the present invention, the detachable piping may be piping through which a gas flows.

This makes it possible to prevent a situation, for example, where water leaks from piping at the time of removing the piping and the leakage water enters the main body package, causing a negative impact such as short-circuiting in electrical wiring provided within the main body package.

In the method for performing maintenance on the fuel cell system, according to the present invention, the main body package may include at least one detachable side face plate. The method may further include: removing the detachable side face plate; removing the detachable piping; and removing the burner from the hydrogen generator through a side face of the main body package, from which side face the side face plate has been removed.

This allows the maintenance on the fuel cell system to be performed in a further simplified manner.

In the method for performing maintenance on the fuel cell system, according to the present invention, the fuel cell system may further include: an air inlet formed at a first side face plate of the main body package and configured to introduce air into the main body package; and an air outlet formed at a second side face plate of the main body package and configured to discharge air to the outside of the main body package. The air inlet may be provided at a position below the stack, and the air outlet may be provided at a position above the hydrogen generator such that the air outlet is opposed to the air inlet.

Accordingly, air for ventilation, which is to flow within the main body package, is sucked through the air inlet, which is positioned laterally with respect to the hydrogen generator, and is discharged from the air outlet, which is provided above the auxiliary device and which is positioned laterally with respect to the stack. This allows the stack and the hydrogen generator to be arranged at respective positions outside a passage through which the air for ventilation flows. This makes the temperatures of the stack and the hydrogen generator less likely to be affected by the ventilation. Therefore, the following situation can be prevented: a change occurs to the temperatures of the hydrogen generator and the stack, and accordingly, additional power or gas is required for temperature control, resulting in a decrease in the overall power generation efficiency of the fuel cell system. Moreover, according to the above configuration, the air for ventilation can be actively applied to the auxiliary device. In this manner, an increase in the temperature of the auxiliary device can be prevented.

The above object, other objects, features, and advantages of the present invention will be made clear by the following detailed description of preferred embodiments with reference to the accompanying drawings.

Advantageous Effects of Invention

The fuel cell system and the method for performing maintenance on the fuel cell system, according to the present invention, realize improved maintainability of a burner of a hydrogen generator.

DETAILED DESCRIPTION OF THE PREFERRED EMBODIMENTS

Figure 1:
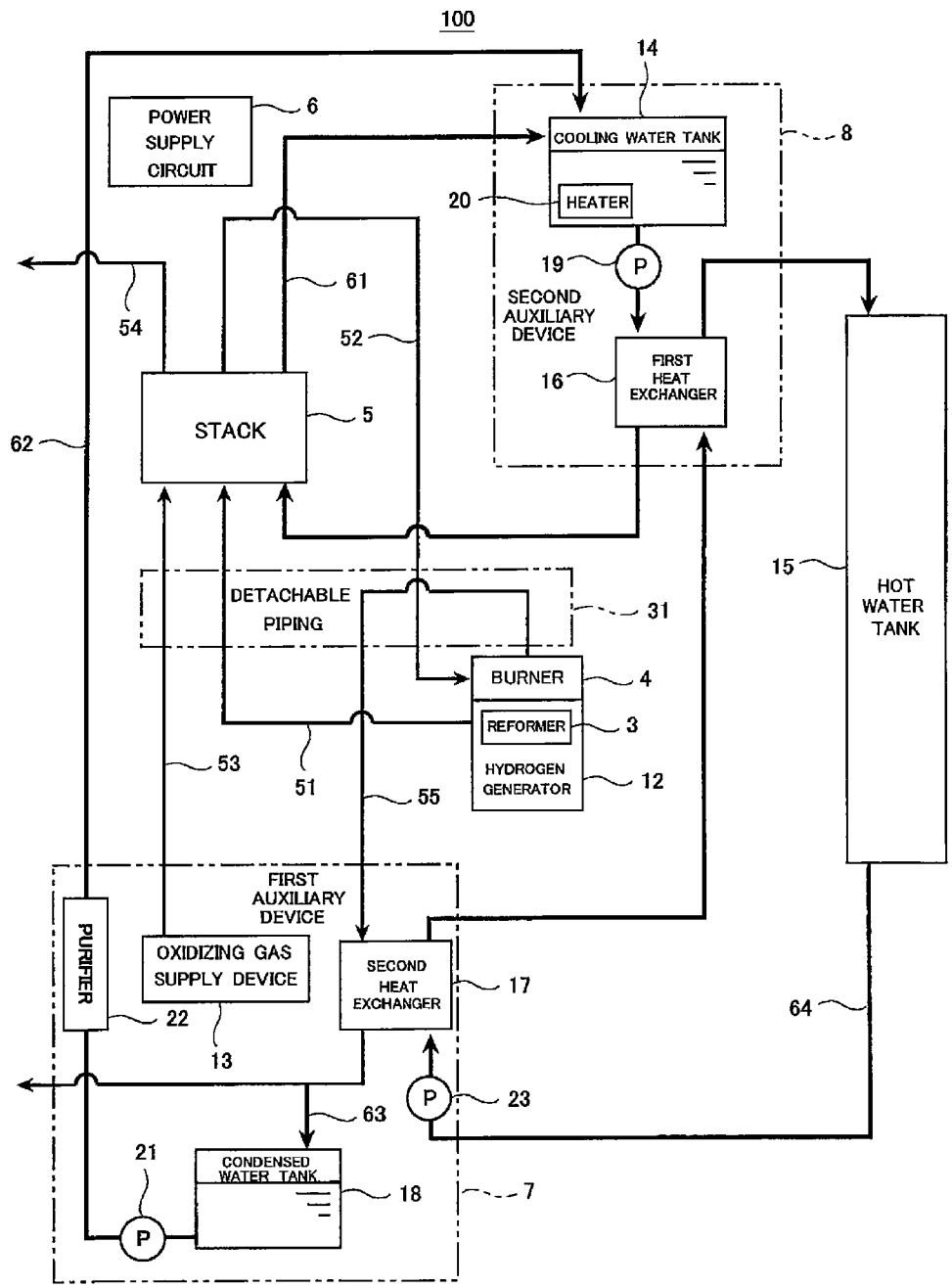
FIG. 1 is a block diagram showing a schematic configuration of a fuel cell system according to Embodiment 1 of the present invention.

Hereinafter, embodiments of the present invention will be described with reference to the drawings. In the drawings, the same or corresponding components are denoted by the same reference signs, and a repetition of the same description is avoided. In the drawings, only the components necessary for describing the present invention are shown, and the other components are omitted. Further, the present invention is not limited to the embodiments.

Embodiment 1

A fuel cell system according to Embodiment 1 of the present invention includes: a hydrogen generator including a burner which is detachably accommodated in the hydrogen generator in a manner to allow the burner to be detached from and attached to the hydrogen generator through the top of the hydrogen generator; a stack configured to generate power by causing hydrogen generated by the hydrogen generator and an oxidizing gas to react with each other; and a main body package which includes at least a top plate and within which the hydrogen generator and the stack are disposed. The fuel cell system according to Embodiment 1 serves as an example where detachable piping, which is detachably configured, is provided above the hydrogen generator, and space that is formed above the burner when the detachable piping is removed from the main body package has a size larger than or equal to the size of the burner.

[Configuration of Fuel Cell System]

First, a configuration of the fuel cell system according to Embodiment 1 of the present invention is described with reference to FIG. 1.

FIG. 1 is a block diagram showing a schematic configuration of the fuel cell system according to Embodiment 1 of the present invention.

As shown in FIG. 1, a fuel cell system 100 according to Embodiment 1 includes: a hydrogen generator 12 including a burner 4; an oxidizing gas supply device 13; a stack 5; a cooling water tank 14; and an electrical circuit 6. The fuel cell system 100 is disposed within a main body package 1 shown in FIG. 2 (not shown in FIG. 1) (see FIG. 3).

The hydrogen generator 12 includes a reformer 3 and a burner 4. The burner 4 is detachably configured so that the burner 4 can be inserted into or removed from the hydrogen generator 12 through the top face of the hydrogen generator 12. For example, the burner 4 is fixed to the hydrogen generator 12 by screws, quick fasteners, or the like.

A raw material gas supply passage (not shown) is connected to the reformer 3. The raw material gas supply passage is configured to supply a raw material gas (e.g., a natural gas of which a main component is methane) to the reformer 3 from a raw material gas source which is not shown. The raw material gas supply passage is provided with a control valve configured to control the supply of the raw material gas, and is provided with a delivery device (booster pump) configured to boost the pressure of the raw material gas to deliver the raw material gas to the reformer 3.

Examples of the raw material gas source include a city gas (natural gas) infrastructure and an LPG canister. A gas containing an organic compound of which constituent elements are at least carbon and hydrogen may be used as the raw material gas. To be specific, examples of the raw material gas include a gas containing hydrocarbons, such as ethane and propane, and a gas containing a gaseous alcohol.

A stack 5 is connected to the burner 4 via an off fuel gas passage 52. The burner 4 is configured to be supplied with a gas for combustion (combustible gas) such as a hydrogen-containing gas discharged from the reformer 3 or a fuel gas that has not been used at the stack 5, and to be supplied with air for combustion. Accordingly, at the burner 4, the combustible gas and the air are combusted and thereby a flue gas is generated. Then, devices, including the reformer 3, are heated by heat transferred by the flue gas. It should be noted that the flue gas flows through the flue gas passage 55 and is then discharged to the outside of the fuel cell system 100 (i.e., to the atmosphere). The gas supplied to the burner 4 is not limited to the hydrogen-containing gas. For example, the raw material gas may be directly used as the gas supplied to the burner 4.

A second heat exchanger 17 is provided at a position along the flue gas passage 55. The second heat exchanger 17 performs heat exchange between the flue gas flowing through the flue gas passage 55 and stored hot water. Then, steam in the flue gas is condensed and thereby water (condensed water) is produced at the flue gas passage 55. The produced condensed water flows through a condensed water passage 63 and is then stored in a condensed water tank 18.

A reforming catalyst (not shown) is provided in the inner space of the reformer 3. In the reformer 3, a steam reforming reaction occurs between the raw material gas supplied through the raw material gas supply passage and steam that is supplied separately from the raw material gas. Consequently, a hydrogen-containing gas is generated. The hydrogen-containing gas generated in the reformer 3 flows through a fuel gas supply passage 51, and is supplied to the stack 5 as a fuel gas.

Embodiment 1 describes a configuration where the hydrogen-containing gas generated in the reformer 3 is directly supplied to the stack 5. However, as an alternative configuration, a shift converter configured to reduce, by shift reaction, carbon monoxide contained in the hydrogen-containing gas generated in the reformer 3, or a CO remover configured to reduce, by oxidation reaction, carbon monoxide contained in the hydrogen-containing gas generated in the reformer 3, may be provided downstream from the reformer 3.

The stack 5 is formed by stacking one or more fuel cells each including an anode and a cathode (which are not shown). The fuel cells for forming the stack 5 are not limited to a particular type. Examples of the type of fuel cells for forming the stack 5 include solid polymer fuel cells, phosphoric-acid fuel cells, and solid oxide fuel cells. It should be noted that a publicly known fuel cell stack may be used as the stack 5. Therefore, the description of the specific configuration of the stack 5 is omitted.

The oxidizing gas supply device 13 is connected to the stack 5 via an oxidizing gas supply passage 53. The oxidizing gas supply device 13 includes an air cleaner such as a filter and a fan-like device such as a fan or blower. Further, an off oxidizing gas passage 54 is connected to the stack 5. It should be noted that the downstream end of the off oxidizing gas passage 54 is open to the atmosphere.

Accordingly, the fuel gas generated by the hydrogen generator 12 (reformer 3) is supplied to the anode of the stack 5 via the fuel gas supply passage 51. Further, the oxidizing gas supply device 13 supplies an oxidizing gas to the cathode of the stack 5 via the oxidizing gas supply passage 53.

In the stack 5, the fuel gas supplied to the anode and the oxidizing gas supplied to the cathode electrochemically react with each other, and thereby power and heat are generated. It should be noted that the fuel gas that has not been used at the anode (hereinafter, an off fuel gas) is supplied to the burner 4 via the off fuel gas passage 52, and used as a combustible gas for combustion. Also, the oxidizing gas that has not been used at the cathode (hereinafter, an off oxidizing gas) flows through the off oxidizing gas passage 54, and is then discharged to the atmosphere.

A cooling water circulation passage 61 is connected to the stack 5. The cooling water tank 14, a cooling water pump 19, and a first heat exchanger 16 are provided at positions along the cooling water circulation passage 61. The cooling water tank 14 includes a heater 20 for consuming surplus power generated by the stack 5. The cooling water pump 19 may be configured in any form so long as the pump is configured to cause the cooling water to circulate along the cooling water circulation passage 61 while adjusting the flow rate of the cooling water. An electric heater such as a sheathed heater may be used as the heater 20.

The condensed water tank 18 is connected to the cooling water tank 14 via a water supply passage 62. A water supply pump 21 and a purifier 22 are provided at positions along the water supply passage 62. The water supply pump 21 may be configured in any form so long as the pump is configured to cause water (condensed water) to flow within the water supply passage 62 while adjusting the water flow rate.

Also, the purifier 22 may be configured in any form so long as the purifier is configured to purify the water within the water supply passage 62. In Embodiment 1, the purifier 22 is configured as a casing filled with an ion exchange resin. In the purifier 22, impurities (mostly ions) contained in the condensed water are adsorbed to the ion exchange resin, and thereby the water is purified. Other than the ion exchange resin, an activated carbon filter, reverse osmosis membrane, or the like may be used as the purifier 22.

A stored hot water circulation passage 64 is connected to a hot water tank 15. A stored hot water pump 23, the second heat exchanger 17, and the first heat exchanger 16 are provided at positions along the stored hot water circulation passage 64. The stored hot water pump 23 may be configured in any form so long as the pump is configured to cause the stored hot water to circulate along the stored hot water circulation passage 64 while adjusting the flow rate of the stored hot water. Accordingly, the hot water stored in the hot water tank 15 is, while flowing through the stored hot water circulation passage 64, heated at the second heat exchanger 17 by the flue gas flowing through the flue gas passage 55, and heated at the first heat exchanger 16 by the cooling water flowing through the cooling water circulation passage 61. Then, the hot water returns to the hot water tank 15.

The electrical circuit 6 includes a high voltage circuit for 100 V or higher and a low voltage circuit. The high voltage circuit is connected to a commercial power supply provided outside the fuel cell system 100. The high voltage circuit includes: an inverter configured to convert DC power generated by the stack 5 into AC power and to supply the AC power to a load connected to the commercial power supply; and a power supply circuit configured to convert AC commercial power supply into DC low voltage. Power generated by the stack 5 is supplied to an external power load (e.g., a household electrical appliance) by means of the high voltage circuit of the electrical circuit 6.

The low voltage circuit serves as a controller configured to control the devices included in the fuel cell system 100. For example, based on power consumption by the load connected to the commercial power supply, the low voltage circuit controls the power generated by the fuel cell system 100 or controls the temperatures of the hydrogen generator 12 and the stack 5.

The controller, which includes the low voltage circuit, may be configured in any form so long as the controller is configured as a device for controlling the devices included in the fuel cell system 100. For example, the controller includes: a microprocessor; an arithmetic processing unit exemplified by, for example, a CPU; and a storage unit configured as a memory or the like which stores a program for performing control operations. It should be noted that the controller may be configured not only as a single controller, but as a group of multiple controllers which operate in cooperation with each other to control the fuel cell system 100. Moreover, the controller may be configured as a microcontroller. Furthermore, the controller may be configured as an MPU, PLC (programmable logic controller), logic circuit, or the like.

In Embodiment 1, the oxidizing gas supply device 13, the second heat exchanger 17, the condensed water tank 18, the water supply pump 21, the purifier 22, and the stored hot water pump 23 are presented as examples of first auxiliary devices. Further, the cooling water tank 14, the first heat exchanger 16, the cooling water pump 19, and the heater 20 are presented as examples of second auxiliary devices.

It should be noted that the above devices are merely examples. Devices other than the above may serve as first auxiliary devices 7 or second auxiliary devices 8. For example, the control valve and the booster pump (which are not shown) provided at the raw material gas supply passage may serve as first auxiliary devices 7. Moreover, control valves for adjusting the flow rates of the fuel gas and oxidizing gas supplied to the stack 5 may serve as second auxiliary devices 8. Furthermore, the devices presented herein as examples of first auxiliary devices 7 may be configured as second auxiliary devices 8. Similarly, the devices presented herein as examples of second auxiliary devices 8 may be configured as first auxiliary devices 7.

Further, in Embodiment 1, a part of piping that forms the fuel gas supply passage 51, the oxidizing gas supply passage 53, and the flue gas passage 55 is detachably configured. The detachable part serves as detachable piping 31. It should be noted that the detachable piping 31 may be attached to or detached from other piping by means of, for example, screws or quick fasteners. In the above description, a part of the piping that forms the fuel gas supply passage 51, the oxidizing gas supply passage 53, and the flue gas passage 55 is configured as the detachable piping 31. However, the present invention is not limited thereto. As an alternative, a part of piping that forms at least one of these passages may be configured as the detachable piping 31. As a further alternative, a part of piping that forms other passages (e.g., the off oxidizing gas passage 54 and the cooling water circulation passage 61) may be configured as the detachable piping 31. In addition, it is preferred that a part of piping that forms gas-flowing passages is configured as the detachable piping 31 from the standpoint of preventing short-circuiting of electrical wiring that may occur when a liquid (water) leaks at the time of the detachment of the detachable piping 31.

[Configuration of Main Body Package]

Next, a schematic configuration of the main body package 1 of the fuel cell system 100 according to Embodiment 1 will be described with reference to FIG. 2 and FIG. 3.

Figure 2:
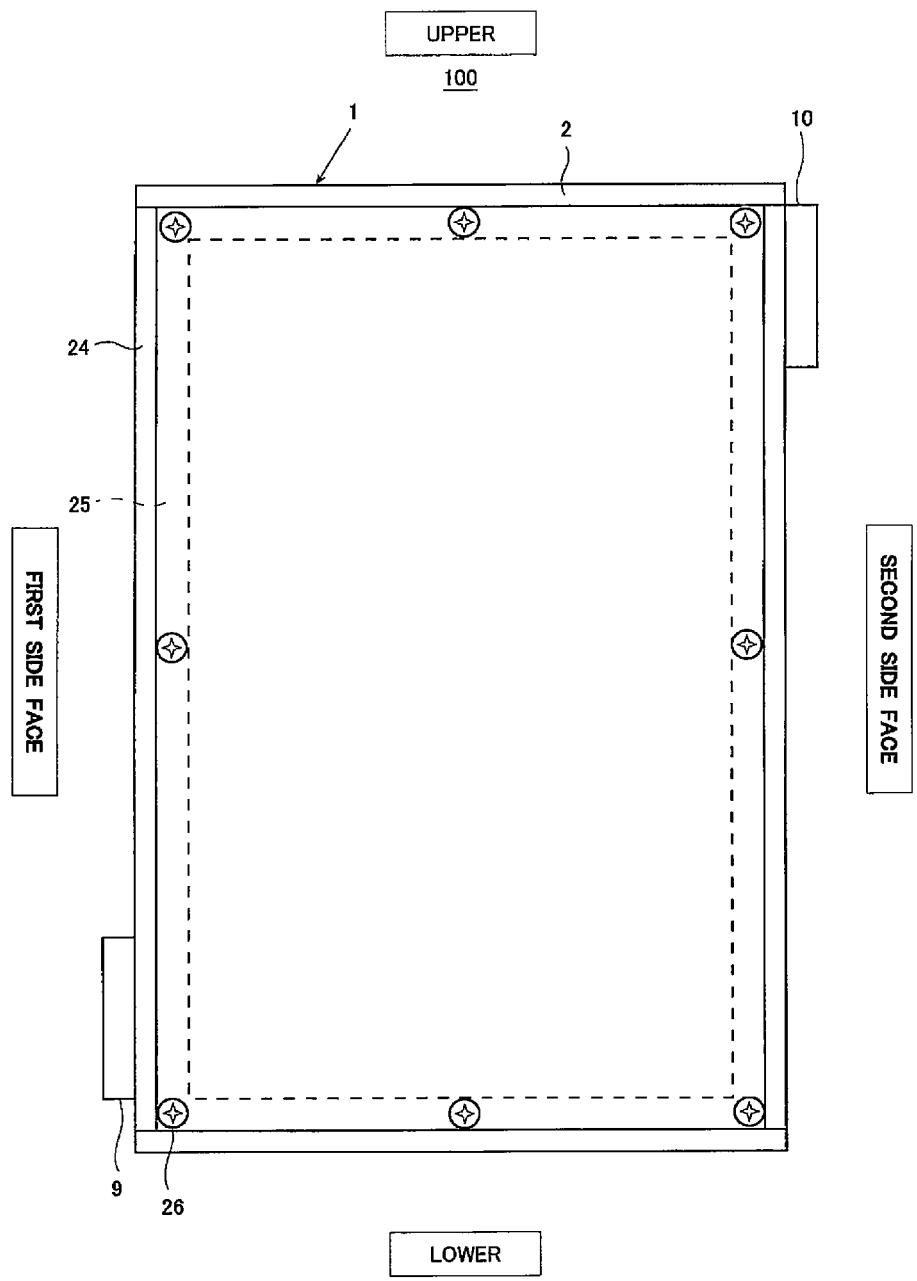
FIG. 2 is a schematic diagram showing an external view of a main body package of the fuel cell system according to Embodiment 1.

FIG. 2 is a schematic diagram showing an external view of the main body package of the fuel cell system according to Embodiment 1. FIG. 3 is a schematic diagram schematically showing an internal configuration of the main body package shown in FIG. 2. It should be noted that the up-down direction in FIG. 2 and FIG. 3 represents the up-down direction in relation to the main body package (fuel cell system).

As shown in FIG. 2, the main body package 1 of the fuel cell system 100 is formed with a metal plate and metal beams. Specifically, the main body package 1 includes a parallelepiped frame 25 and exterior plates 24 which cover the six faces of the frame 25. Hereinafter, one of the six exterior plates 24 that is disposed on the top face of the main body package 1 is referred to as a top plate 2. The top plate 2 is detachably fitted to the frame 25 by screws or the like. Although in Embodiment 1 the top plate 2 is detachably configured, the top plate 2 may be configured such that the top plate 2 is undetachable.

An air inlet 9 is provided at a lower part of an exterior plate (a first side face plate) 24 positioned on one side face (hereinafter, a first side face) of the main body package 1. An air outlet 10 is provided at an upper part of an exterior plate (a second side face plate) 24 positioned on a side face that is located at the opposite position to the first side face (hereinafter, a second side face). An exterior plate 24, positioned on a side face of the main body package 1 that is different from the first and second side faces (hereinafter, a front face), is detachably fitted to the frame 25 by screws 26 or the like. It should be noted that in Embodiment 1, the air inlet 9 and the air outlet 10 are each provided with a hood for preventing foreign matter from entering the main body package 1.

Figure 3:
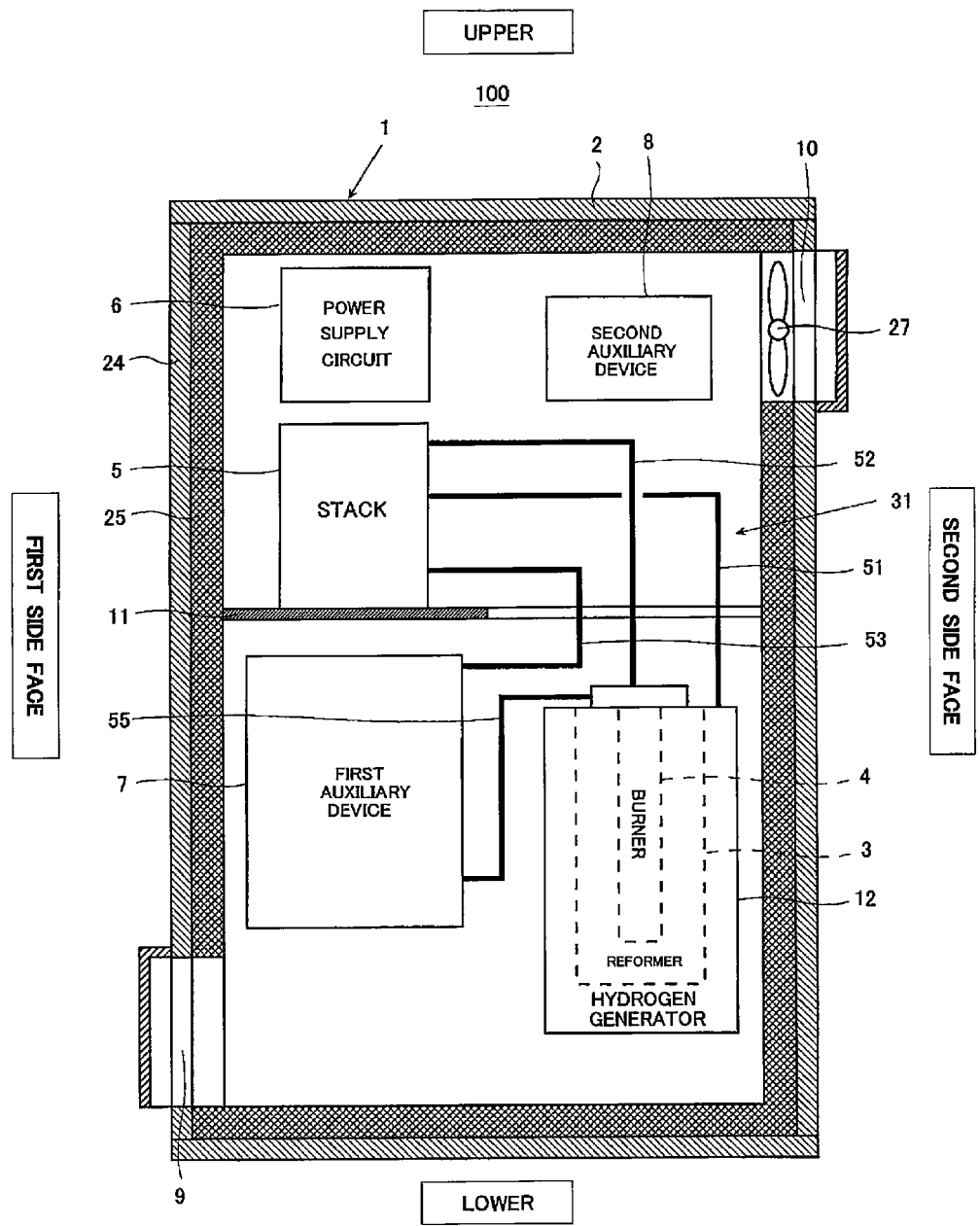
FIG. 3 is a schematic diagram schematically showing an internal configuration of the main body package shown in FIG. 2.

As shown in FIG. 3, the hydrogen generator 12, the stack 5, the electrical circuit 6, the first auxiliary devices 7, and the second auxiliary devices 8 are disposed within the main body package 1. It should be noted that the hot water tank 15 may be disposed either within the main body package 1, or within a package that is different from the main body package 1.

At a lower part within the main body package 1, the first auxiliary devices 7 and the hydrogen generator 12 are arranged, such that space is formed between the bottom of the main body package 1 and the first auxiliary devices 7 and hydrogen generator 12 (i.e., arranged at positions that are distant from the bottom of the main body package 1 by a predetermined height). Specifically, the first auxiliary devices 7 are disposed at the first side face side within the main body package 1, and the hydrogen generator 12 is disposed at the second side face side within the main body package 1. That is, the first auxiliary devices 7 are provided near the air inlet 9, and the hydrogen generator 12 is provided away from the air inlet 9. It should be noted that the devices serving as the first auxiliary devices 7 are arranged such that they are distant from each other for the purpose of allowing external air introduced through the air inlet 9 to flow within the main body package 1.

A partition plate 11 is disposed above the first auxiliary devices 7 and the hydrogen generator 12. The stack 5 is disposed on the upper face of the partition plate 11. The electrical circuit 6 is disposed above the stack 5. Preferably, the stack 5 and the hydrogen generator 12 are arranged such that their positions overlap when viewed in the vertical direction, from the standpoint of reducing the size of the main body package 1 (i.e., from the standpoint of reducing the size of the bottom of the main body package 1). More preferably, the stack 5 and the hydrogen generator 12 are arranged such that their positions do not overlap.

Preferably, when seen in the vertical direction, the stack 5 is disposed at a position near a corner (edge) of the main body package 1 from the standpoint of preventing the stack 5 from being exposed to ventilation air that flows through the main body package 1. In other words, it is preferred that the stack 5 is disposed at a position surrounded by two exterior plates 24 that cover side faces of the main body package 1. Accordingly, by means of the partition plate 11, the lower face of the stack 5 is prevented from being exposed to ventilation air that flows through the main body package 1.

The partition plate 11 has an opening above the hydrogen generator 12. The detachable piping 31 is disposed in space above the hydrogen generator 12, the space including the opening of the partition plate 11. In Embodiment 1, the space, in which the detachable piping 31 is disposed, is formed such that the size of the space is greater than or equal to the size of the burner 4. The second auxiliary devices 8 are disposed above the space in which the detachable piping 31 is disposed. A ventilation fan 27 is provided at the second side face side of the second auxiliary devices 8. Specifically, the height of the lowest part of the second auxiliary devices 8 from the upper face of the hydrogen generator 12 is set to be greater than the height of the burner.

The air inlet 9 is provided at a position below the stack 5. From the standpoint of preventing the stack 5 from being exposed to external air (ventilation air) that is introduced into the main body package 1 through the air inlet 9, it is preferred that the air inlet 9 is provided at an exterior plate (side face plate) 24 covering a side face, of the main body package 1, that is close to the stack 5.

The air outlet 10 is provided at a position above the stack 5 such that the air outlet 10 is opposed to the air inlet 9. The wording "opposed to" herein refers to a state where the air outlet 10 and the air inlet 9 are not provided at the same exterior plate 24, and more specifically, refers to a state where the air outlet 10 is provided at one of a pair of exterior plates 24 that are located at opposite positions, and the air inlet 9 is provided at the other one of the pair of exterior plates 24.

[Method for Performing Maintenance on Fuel Cell System]

Figure 4:
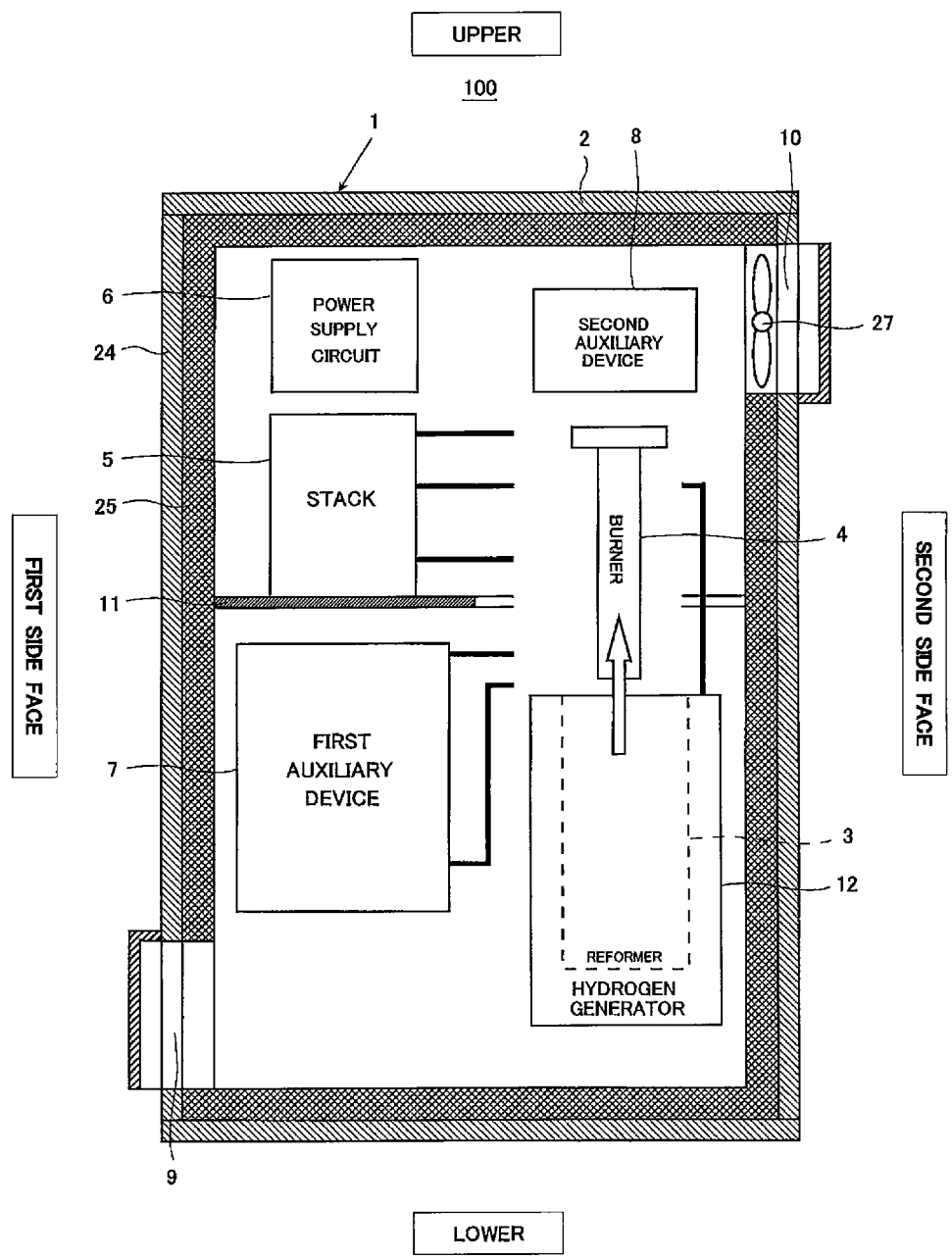
FIG. 4 is a schematic diagram showing a state where maintenance is performed on a burner of the fuel cell system according to Embodiment 1.

Described next with reference to FIG. 2 to FIG. 4 is maintenance performed on the burner 4 of the fuel cell system 100 according to Embodiment 1.

FIG. 4 is a schematic diagram showing a state where maintenance is performed on the burner of the fuel cell system according to Embodiment 1.

In the case of performing maintenance on the burner 4, the burner 4 is removed from the hydrogen generator 12. Specifically, first, the screws 26 fixing the exterior plate 24 to the front face of the main body package 1 are removed, and then the exterior plate 24 is removed (see FIG. 2). Next, screws or the like fitting the detachable piping 31 are removed, and then the detachable piping 31 is removed from the main body package 1 (see FIG. 3). Subsequently, screws or the like fitting the burner 4 to the hydrogen generator 12 are removed, and then the burner 4 is removed from the hydrogen generator 12 by pulling the burner 4 out of the hydrogen generator 12 in the upper direction (see FIG. 4). Here, merely removing the detachable piping 31 from the main body package 1, without removing the entire hydrogen generator 12 from the main body package 1, renders the burner 4 ready to be removed from the main body package 1, because, as described above, the space in which the detachable piping 31 is disposed has a size larger than or equal to the size of the burner 4.

If, at the time of performing maintenance on the burner 4, a part of piping that forms water-flowing passages (including the cooling water circulation passage 61, for example) is removed, then water leakage from the piping may occur and the leakage water may enter the main body package 1, causing short-circuiting in the electrical wiring, for example. From the standpoint of preventing such short-circuiting, it is desired not to remove a part of piping that forms water-flowing passages.

[Operational Advantages of Fuel Cell System]

Next, operational advantages of the fuel cell system 100 according to Embodiment 1 are described.

Figure 5:
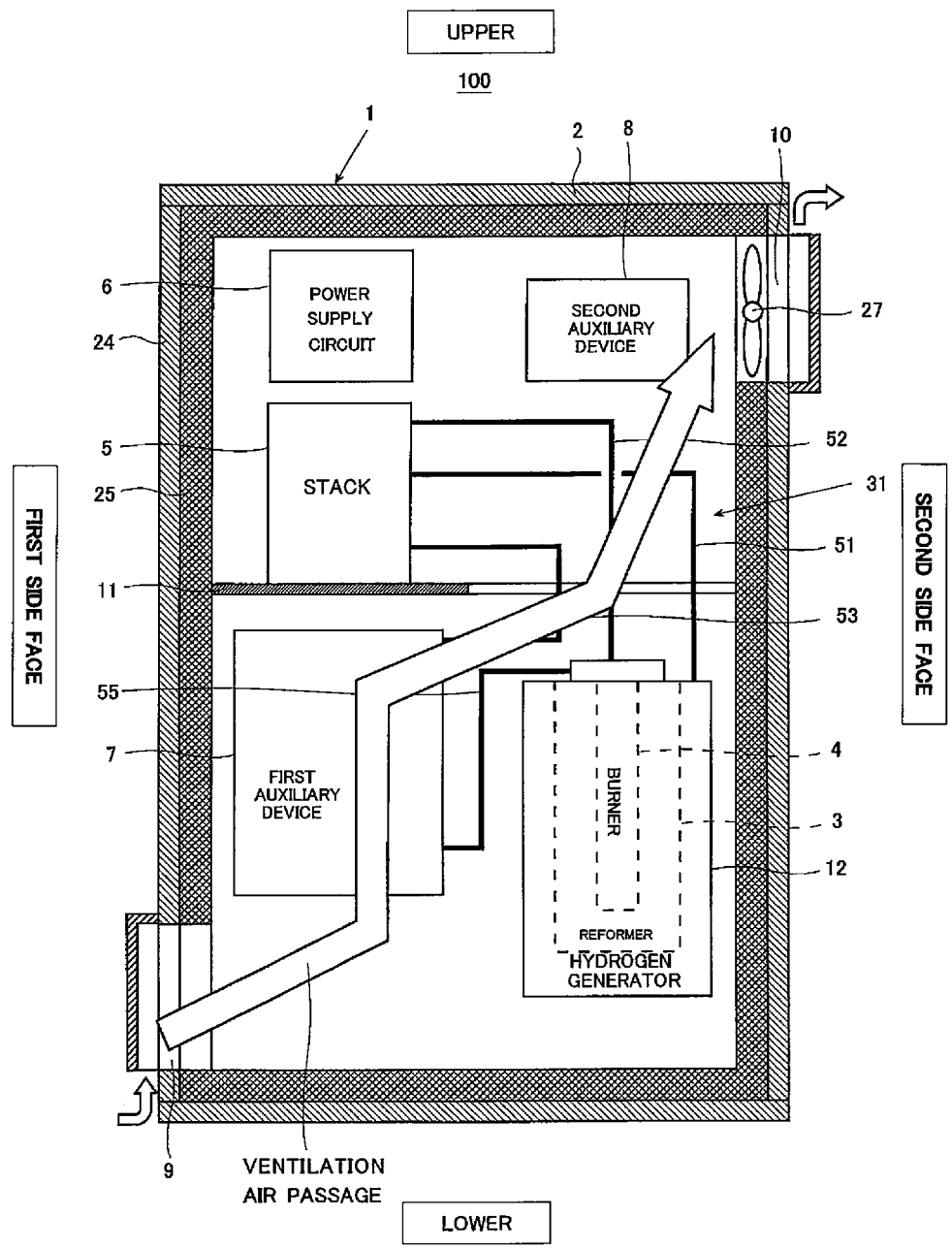
FIG. 5 is a schematic diagram showing a ventilation air passage in the fuel cell system according to Embodiment 1.
Figure 6:
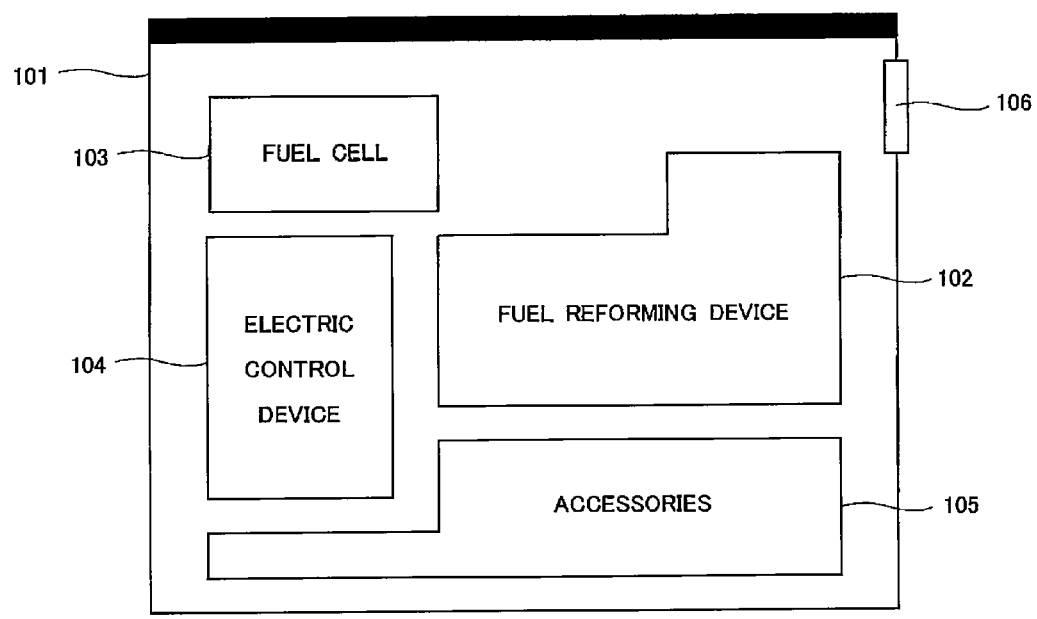
FIG. 6 is a schematic diagram showing a schematic configuration of a fuel cell apparatus disclosed in Patent Literature 1.

Described first with reference to FIG. 5 is a flow of ventilation air within the main body package 1 during the operation of the fuel cell system 100.

FIG. 5 is a schematic diagram showing a ventilation air passage in the fuel cell system according to Embodiment 1.

As shown in FIG. 5, external air is introduced into the main body package 1 through the air inlet 9 as a result of the ventilation fan 27 operating during the operation of the fuel cell system 100. The external air, introduced into the main body package 1 through the air inlet 9, flows from a position below the first auxiliary devices 7 and passes by the devices that serve as the first auxiliary devices 7. Then, the air flows through the opening of the partition plate 11 and passes through the space in which the detachable piping 31 is provided. Thereafter, the air passes by the devices that serve as the second auxiliary devices 8, and is then discharged through the air outlet 10 to the outside of the main body package 1 (fuel cell system 100). The path through which the external air (ventilation air) flows within the main body package 1 is hereinafter referred to as a ventilation air passage.

Although the temperatures of the first auxiliary devices 7 and the second auxiliary devices 8 are not controlled by the electrical circuit 6, the auxiliary devices include those which generate heat while operating and thereby cause an increase in temperature. Such an auxiliary device is, for example, a pump. For this reason, it is necessary to actively apply the ventilation air to such an auxiliary device for cooling down so that the temperature of the auxiliary device will not exceed its guaranteed operating temperature range.

The temperatures of the hydrogen generator 12 and the stack 5 are controlled by the electrical circuit 6. If the temperatures of the hydrogen generator 12 and the stack 5 decrease for the reason that the ventilation air is applied to the hydrogen generator 12 and the stack 5, then it is necessary for the electrical circuit 6 to control, for temperature adjustment, the first auxiliary devices 7 and the second auxiliary devices 8 to perform operations such as additional combustion of the raw material gas, thereby increasing the temperatures. This may cause a decrease in power generation efficiency which indicates the proportion of the amount of power generation to the consumption of the raw material gas by the fuel cell system 100. Therefore, for the purpose of preventing such a decrease in the power generation efficiency of the fuel cell system 100, it is necessary to avoid the additional use of the raw material gas by configuring the hydrogen generator 12 and the stack 5 in such a manner that the hydrogen generator 12 and the stack 5 do not receive the influence of the ventilation air.

In this respect, in the fuel cell system 100 according to Embodiment 1, the devices are arranged in the main body package 1 in such a manner that the above-described ventilation air passage is formed. This makes it possible to prevent a decrease in the power generation efficiency of the fuel cell system 100.

Further, in the fuel cell system 100 according to Embodiment 1, the air outlet 10 is disposed at a position distant from the electrical circuit 6. As a result, the ventilation air flowing within the main body package 1 does not pass by the electrical circuit 6.

In case of leakage of combustible gas within the main body package 1 such as the raw material gas or hydrogen gas, the fuel cell system 100 stops its power-generation operation and the leaked combustible gas is discharged through the air outlet 10 to the outside of the main body package 1 by means of the ventilation air. At this time, the ventilation air does not pass by the electrical circuit 6 owing to the above-described configuration. This prevents a situation where the combustible gas is ignited by the high voltage circuit included in the electrical circuit 6, and also prevents a situation where the leakage gas carried by the ventilation air stagnates at the electrical circuit 6. Therefore, the ignition of the combustible gas at the electrical circuit 6 can be prevented at the time of starting up the fuel cell system 100 again.

It should be noted that the electrical circuit 6 generates heat, and therefore, it is necessary to cool down the electrical circuit 6. For this reason, an air inlet and an air outlet dedicated for the electrical circuit 6 are formed at an exterior plate 24 of the main body package 1 that is provided near the electrical circuit 6, at such positions as not to affect the ventilation air passage. Accordingly, ventilating operations are performed using the air inlet and the air outlet.

As described above, at the time of performing maintenance on the burner 4 of the fuel cell system 100 according to Embodiment 1, merely removing the detachable piping 31 from the main body package 1, without removing the hydrogen generator 12 from the main body package 1, renders the burner 4 ready to be removed from the hydrogen generator 12. This improves the maintainability of the fuel cell system 100.

Further, in the fuel cell system 100 according to Embodiment 1, the devices included in the fuel cell system 100 are arranged within the main body package 1 in such a manner that the ventilation air passage as shown in FIG. 5 is formed within the main body package 1. Accordingly, the first auxiliary devices 7 and the second auxiliary devices 8, the temperatures of which are not controlled by the electrical circuit 6 and which need to be cooled down by the ventilation air, are exposed to the ventilation air. In this manner, the devices serving as the first auxiliary devices 7 and the second auxiliary devices 8 can be cooled down. Moreover, the hydrogen generator 12 and the stack 5, which should not be exposed to the ventilation air, are disposed outside the ventilation air passage. This makes the temperatures of the hydrogen generator 12 and the stack 5 less likely to be affected by the ventilation air. In this manner, a decrease in the power generation efficiency of the fuel cell system 100 can be prevented.

In Embodiment 1, the auxiliary devices include the first auxiliary devices 7 and the second auxiliary devices 8, separately. However, the auxiliary devices may be only the second auxiliary devices 8. In this case, the devices serving as the first auxiliary devices 7, which are shown in, for example, FIG. 2, are disposed in the space in which the second auxiliary devices 8 are disposed. Similarly, the auxiliary devices may be only the first auxiliary devices 7. In this case, the devices serving as the second auxiliary devices 8, which are shown in, for example, FIG. 2, are disposed in the space in which the first auxiliary devices 7 are disposed.

Still further, electrical wiring and the like that are readily movable or detachable may be left in the space that is formed above the burner 4 when the detachable piping 31 is removed. This is because the substantial bulk of the maintenance on the burner 4 can be performed if the detachable piping 31 is removed.

From the foregoing description, numerous modifications and other embodiments of the present invention are obvious to one skilled in the art. Therefore, the foregoing description should be interpreted only as an example and is provided for the purpose of teaching the best mode for carrying out the present invention to one skilled in the art. The structures and/or functional details may be substantially modified without departing from the spirit of the present invention. In addition, various inventions can be made by suitable combinations of a plurality of components disclosed in the above embodiments.

INDUSTRIAL APPLICABILITY

The fuel cell system and the method for performing maintenance on the fuel cell system according to the present invention, which realize improvement in maintainability of a burner of a hydrogen generator, are useful in the field of fuel cells.

The invention claimed is:

1. A fuel cell system comprising:
    a main body package which includes at least a top plate and a detachable side face plate, the detachable side face plate being disposed to cover a side opening of the main body package;
    a hydrogen generator disposed in the main body package and including a reformer and a burner, the burner being detachably accommodated in the hydrogen generator in a manner to allow the burner to be detached from and attached to the hydrogen generator through the top of the hydrogen generator;
    a stack disposed in the main body package and configured to generate power by causing hydrogen generated by the hydrogen generator and an oxidizing gas to react with each other; and
    detachable piping which is disposed in space and is a part of piping that forms at least one of a fuel gas supply passage, an oxidizing gas supply passage, an off oxidizing gas passage, a fuel gas passage, and a cooling water circulation passage, the space being above the hydrogen generator and facing the side opening and having a size larger than or equal to the size of the burner, wherein
    the burner is attachable to or detachable from the reformer and the main body package in a side direction of the main body package through the side opening,
    a partition plate dividing inner space of the main body package into an upper part and a lower part is disposed at a position above the hydrogen generator, and
    an opening through which the upper part and the lower part of the inner space of the main body package are in communication with each other is formed in a portion of the partition plate, the portion overlapping the hydrogen generator when seen from above, wherein the opening of the partition plate is formed such that the opening is larger than the burner.

2. The fuel cell system according to claim 1, wherein an auxiliary device is provided above the detachable piping, and
the height of the lower face of the auxiliary device from the upper face of the hydrogen generator is set to be greater than the height of the burner.

3. The fuel cell system according to claim 1, wherein the detachable piping is piping through which a gas flows.

4. The fuel cell system according to claim 1, further comprising:
    an air inlet formed at a first side face plate of the main body package and configured to introduce air into the main body package; and
    an air outlet formed at a second side face plate of the main body package and configured to discharge air to the outside of the main body package, wherein
    the air inlet is provided at a position below the stack,
    the air outlet is provided at a position above the hydrogen generator such that the air outlet is opposed to the air inlet,
    a power supply circuit is disposed in the upper part of the inner space of the main body package, such that the power supply circuit is positioned at the first side face plate side of the main body package, and
    a ventilator is provided at the air outlet.

* * * * *